United States Patent
Schwarz, Jr. et al.

(10) Patent No.: US 6,552,815 B2
(45) Date of Patent: Apr. 22, 2003

(54) SOFTWARE VALIDATION METHOD AND SYSTEM

(75) Inventors: James K. Schwarz, Jr., Boulder, CO (US); Sol Goldenberg, Rockaway, NJ (US); John Liu, Parsippany, NJ (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/919,645

(22) Filed: Jul. 31, 2001

(65) Prior Publication Data

US 2001/0046061 A1 Nov. 29, 2001

Related U.S. Application Data

(63) Continuation of application No. 09/267,751, filed on Mar. 10, 1999, now Pat. No. 6,292,270.

(51) Int. Cl.$^7$ .................. G06K 15/02; G06F 11/36; G06F 9/44
(52) U.S. Cl. .................. 358/1.13; 358/406; 714/38; 714/45; 714/46; 717/124; 717/125
(58) Field of Search ................. 358/1.13, 1.14, 358/406; 714/38, 25, 33, 37, 39, 45, 46; 717/124, 131, 125

(56) References Cited

U.S. PATENT DOCUMENTS 4,696,003 A * 9/1987 Kerr et al. .................. 714/38
5,335,342 A * 8/1994 Pope et al. .................. 714/38

* cited by examiner

*Primary Examiner*—Scott Rogers

(57) ABSTRACT

A method embodiment of the invention tests revisions made to printer graphics interpreter software. A test suite of POSTSCRIPT, PCL, or other high-level printer language is input to a production version of a printer's internal interpreter software. A first bit-map is generated by the interpreter that is normally used to control each pixel in the printing of a page. The same test suite is fed to a work-in-progress revision of the printer's internal interpreter software. A second bit-map is generated. The first and second bit-maps are subtracted from one another. A difference bit-map is inspected. If only minor shifts of objects are noted, or if no differences at all are apparent, the work-in-progress revision is accepted as the new production standard. The second bit-map is used to replace the first. Otherwise, the work-in-progress revision of the printer's internal interpreter software is reworked to correct the printing interpretation errors it was making.

2 Claims, 2 Drawing Sheets

SOFTWARE VALIDATION METHOD AND SYSTEM

This application is a continuation of U.S. application Ser. No. 09/267,751 filed Mar. 10, 1999 now U.S. Pat. No. 6,292,270.

BACKGROUND OF THE PRESENT INVENTION

1. Technical Field

The invention relates to testing and validating software programs. In particular, the invention relates to testing and validating changes to printer graphic interpreter software that converts high level script to bitmaps.

2. Description of the Prior Art

Back in the 1970's, ordinary personal-computer printers, such as the Centronics could only print characters on lines. The computer sent so-called ASCII-encoded 7-bit and 8-bit parallel digital signals to these printers and the printers knew how to print each character using a built-in font. Later, dot matrix type printers were sold that could do both character printing and some crude graphics. The advent of the inexpensive laser printer allowed far better graphics to be printed because the dot-density was as high as 300 dots-per-inch, and a whole bit-map could be downloaded that precisely described what was to be printed. But downloading bit-maps took a lot of processor time and memory storage to manipulate.

Because objects to be printed on paper can be described more efficiently using a high-level language than setting the exposure of every pixel in a bit-map, several printer control languages have now become universal. For example, Hewlett-Packard introduced PCL, and Adobe Systems introduced POSTSCRIPT. Many other such printer control languages also exist now, but they all convert or interpret the high-level language print job coming from the computer to the printer into a bit-map that represents the final printed page. Such bit-maps are used inside laser printers to set the exposure bit-by-bit on the xerographic drum that electrostatically picks up toner and deposits it on paper for thermal fusing.

PostScript is a computer programming language and a page description language. Unlike Basic and C, PostScript is designed to be executed rather than compiled. PostScript describes document pages in mathematical expressions. In its purest forms, PostScript describes the fonts, pages, and resources in a document as completely independent procedures. These can be extracted and used by other PostScript files, or by programs that manipulate PostScript pages, e.g. imposition programs.

PostScript describes everything on a page as graphic objects in terms of how to draw vectors. Rather than commanding the printer to put a dot here, put a dot there, PostScript instructs the printer to draw a line from here to here. This approach allows PostScript users to create files that produce the highest quality output a device can produce, whether the same file is sent to a high resolution imagesetter or an old Apple LaserWriter printer.

PostScript was introduced by Adobe in 1985 and first appeared in the Apple LaserWriter. The main purpose of PostScript was to provide a convenient language in which to describe images in a device independent manner. This device independence means that the image is described without reference to any specific device features. In practice, some PostScript files do make assumptions about the target device, such as its resolution or the number of paper trays.

The language itself is typically interpreted. It is stack-based, as is a reverse-Polish-notation calculator. The arguments are present first, and then the operators are loaded. For example, to add "2+2", stack-based operating systems need to see entered, "2, 2, +".

The device space is the coordinate space understood by the printer hardware. Such coordinate system is typically measured in terms of the device's resolution. There is really nothing else that can be said about this space, as PostScript programs are typically not expressed using it. User space is the coordinate system used by PostScript programs to describe the location of points and lines. User space is essentially the same as the first quadrant of the standard coordinate system. Point (0, 0) is in the lower left corner. Coordinates are real numbers, so there is no set resolution in user space. The interpreter automatically converts user space coordinates into device space. The current transformation matrix is used for the transformation of user space coordinates to device space coordinates. Such matrix is a three-by-three matrix that allows the user to rotate, scale, and translate the entire user space within the device space.

A path is a collection of line segments and curves arranged on the page. The path does not describe actual ink on the paper. It merely describes an imaginary tracing over the page. There are operators which allow the user to draw or stroke ink along the path, fill an enclosed path with ink, and clip out all future images that are outside the path. The current path is the path that the PostScript program is creating at any one moment. The current path is assembled piece by piece. The PostScript rendering system ignores any part of a line segment, curve, or bitmap that extends outside a certain region. It only draws the parts of those elements which are within the region. The region is described by a path called the clipping path. The clipping path is usually a rectangle about a quarter of an inch in from the edge of the page, but it can easily be set by the user to an arbitrary path. The graphics state is a collection of various settings that describe the current state of the graphics system. For example, the current path, the current font, and the current transformation matrix are all parts of the graphics state.

A "comment" in PostScript is any text preceded by a '%'. Many systems use a special comment, "%!", as the first two characters of a PostScript program, to tag the file as PostScript code. There are several stacks in a PostScript system, but only two are needed to start learning POSTSCRIPT, e.g. the operand stack, and the dictionary stack. The operand stack is where arguments to procedures (or operators, in PostScript jargon) are pushed prior to use. The dictionary stack provides storage for variables. A dictionary is a collection of name-value pairs. All named variables are stored in dictionaries. Also, all available operators are stored in dictionaries along with their code. The dictionary stack is a stack of all currently open dictionaries. When a program refers to some key, the interpreter wanders down the stack looking for the first instance of that key in a dictionary. In this manner, names may be associated with variables and a simple form of scoping is implemented. Conveniently, dictionaries may be given names and be stored in other dictionaries. A name is any sequence of characters that can not be interpreted as a number. With the exception of spaces and certain reserved characters, any character may be part of a name. The name may even start with digits, "1Z" is a name, for example. A name is seen as being a reference to some value in a dictionary on the dictionary stack.

Programming in PostScript requires that operands be pushed onto the operand stack by naming them, and then invoking an operand to use them. The only real difficulty is knowing which operand to use. Operators to draw and put text on the screen make up the bulk of PostScript code, but there are a couple that are used mainly for maintaining the program itself. The first of these operators is def. "def" is responsible for entering a definition into the top-most dictionary on the dictionary stack. The top operand on the operand stack is the value, and the operand below the value is the key, and should be a name. The "def" operator can also be used to define new operators.

The main purpose of PostScript is to draw graphics on the page. In PostScript, even text is a kind of graphic. The main task that must be mastered, then, is constructing paths which may be used to create the image. To draw and fill shapes, the basic sequence is, 1) start the path with the newpath operator. Construct the path out of line segments and curves, and 2) draw the path with the stroke operator or fill it in with the fill operator. This basic sequence can be modified to do more complicated things.

The "lineto" operator works in absolute coordinates within user space. That is, "72 72 lineto" adds a line segment from the current point to the point (72, 72) in user space. In drawing the box, the absolute coordinates of the box's vertices can be ignored. Only the lengths and directions of the box's sides are important. PostScript includes a version of "lineto" that allows relative coordinates to be used instead, e.g. the "rlineto" operator. Such adds any coordinates given, as operands to the coordinates of the current point in the path, to find the destination point. That is, "10 20 rlineto" draws a line from the current point to a point 10-points to the right and 20-points toward the top of the page. This is in contrast to "10 20 lineto" which adds a line segment which always ends at (10, 20).

Filling shapes is done by invoking the "fill" operator which fill the path with the current ink settings. "Fill" uses a simple winding rule to determine what parts of the page are inside or outside the path. The regions that are inside are painted. Arbitrarily complex shapes can be filled with this operator.

It is often necessary to revise such interpreter software. The difficulty in the prior art has been in testing new versions of software for printer interpreters for hidden bugs in the programs. It typically takes a lot of time and resources, and has never been completely effective. It would be advantageous to provide a method or apparatus that tests revisions made to printer graphics interpreter software.

SUMMARY OF THE PRESENT INVENTION

A method embodiment of the invention tests revisions made to printer graphics interpreter software. A test suite of POSTSCRIPT, PCL, or other high-level printer language is input to a production version of a printer's internal interpreter software. A first bit-map is generated by the interpreter that is normally used to control each pixel in the printing of a page. The same test suite is fed to a work-in-progress revision of the printer's internal interpreter software. A second bit-map is generated. The first and second bit-maps are subtracted from one another. A difference bit-map is inspected. If only minor shifts of objects are noted, or if no differences at all are apparent, the work-in-progress revision is accepted as the new production standard. The second bit-map is used to replace the first. Otherwise, the work-in-progress revision of the printer's internal interpreter software is reworked to correct the printing interpretation errors it was making.

DETAILED DESCRIPTION OF THE PRESENT INVENTION

Figure 1:
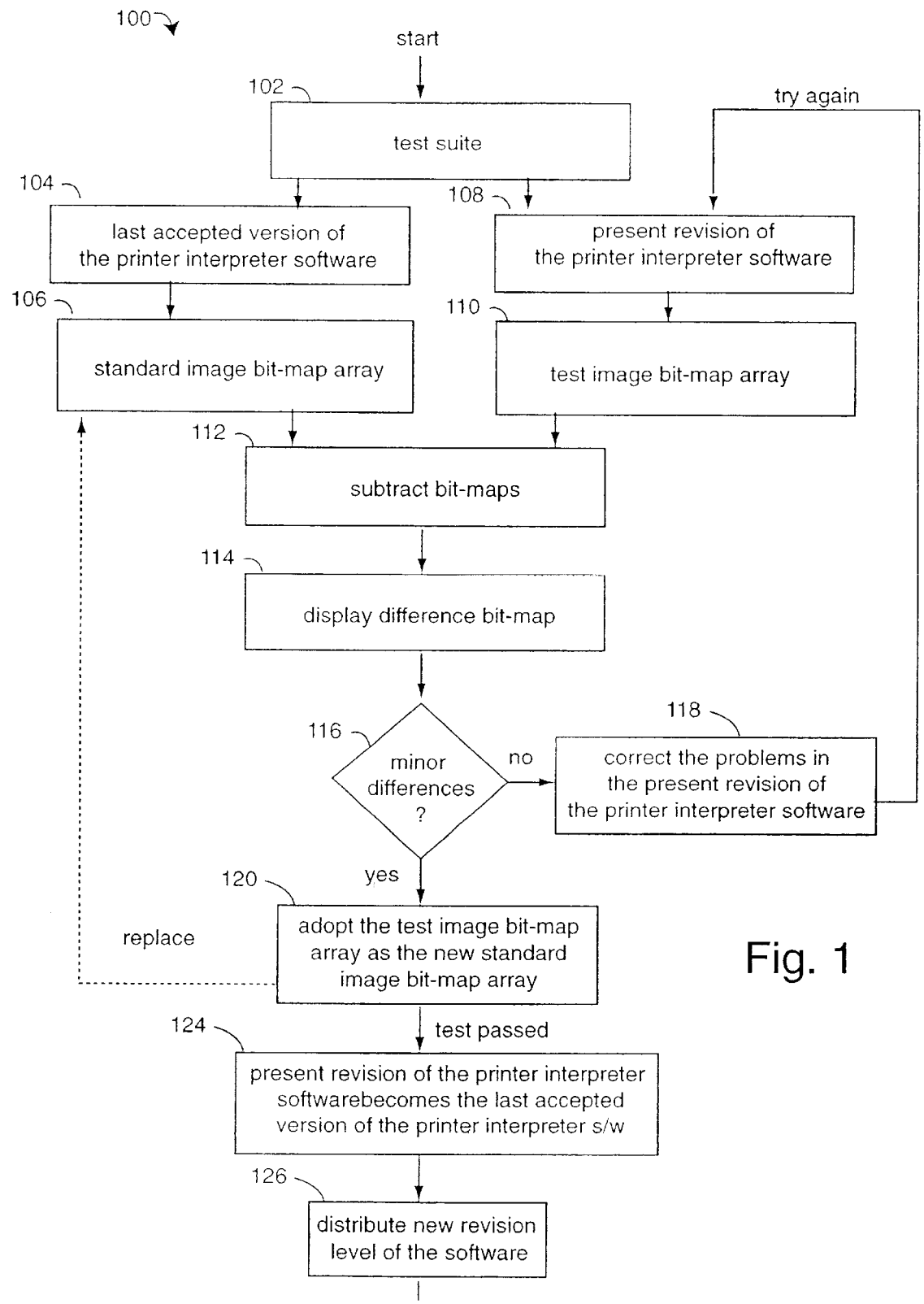
FIG. 1 is a flowchart diagram showing a computer-implemented embodiment of the present invention for the software validation of revisions to a printer's internal print-language interpreter software.

FIG. 1 illustrates a computer-implemented embodiment of the invention for the software validation of revisions to a printer's internal print-language interpreter software, and is referred to herein by the general reference numeral 100. The method 100 is preferably implemented to execute on a computer platform, e.g. an IBM-compatible personal computer with the WINDOWS operating system. Alternatively, the 100 can be implemented to execute on a target printer's embedded microcomputer.

The method 100 begins by generating 102 a repeatable test suite of high-level printer control language commands in an appropriate format such as Adobe Systems POSTSCRIPT, Hewlett-Packard PCL, or Apple Computer QUICKDRAW. A last-accepted version of a printer's internal print-language interpreter software is used 104 to generate a standard-image bit-map 106 from the test suite. A work-in-progress version of a printer's internal print-language interpreter software is used 108 to generate a test-image bit-map 110 also from the test suite. The standard-image and test-image bit-maps are subtracted 112 from one another to produce a difference bit map. Such difference map is displayed 114 on a monitor screen so that a user can see what, if any, differences exist.

It the differences are not minor, then the problems in the work-in-progress version of the printer's internal print-language interpreter software are corrected 118. This may involve rewriting the source code and recompiling, and then downloading the new machine code program to the target processor. The location and the nature of any anomalies in the difference bit-map can be used as clues for the programmer to focus his efforts in correcting the proposed revision.

If the difference bit-map shows only minor or no anomalies, then the test-image bit-map is adopted 120 from test-image bit-map 110 as the new standard-image bit-map, and replaces such for future use in generating a standard-image bit-map 106 from the test suite. At this point, the test of the new software has passed. The present revision of the printer's internal print-language interpreter software (108) is used 122 to replace the previous one that was in production (104). The new printer's internal print-language interpreter software is distributed 124 and the process 100 concludes.

Figure 2:
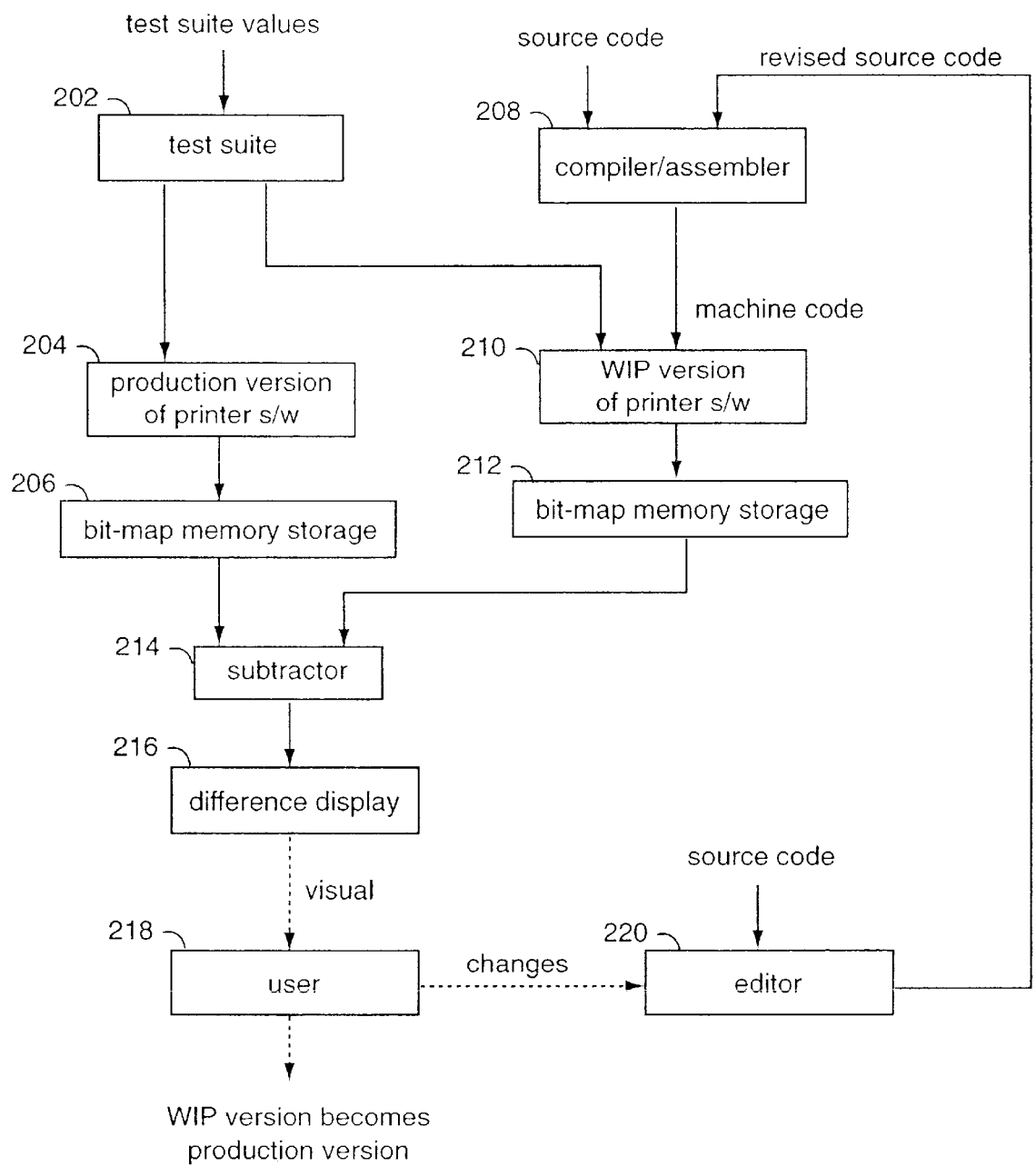
FIG. 2 is a functional block diagram of a development system embodiment of the present invention for the software validation of revisions to a printer's internal print-language interpreter software.

FIG. 2 is a functional block diagram of a development system embodiment of the invention for the software validation of revisions to a printer's internal print-language interpreter software, and is referred to herein by the general reference numeral 200. The development system 200 is intended to be used by a printer manufacturer in the development, coding, production, and on-going support of printer-control-language interpreters used in laser printers. A test suite 202 is assembled by the user that exercises all of the commands and capabilities of a particular printer with an embedded printer-control-language interpreter. Initially, such as with a new printer, a production version 204 of the embedded printer-control-language interpreter is agreed upon. This is used to generate a "gold" bit-map image which is stored in a memory 206.

Later, when a change is proposed to replace or update the production version 204 of the embedded printer-controllanguage interpreter, a compiler/assembler 208 is used to generate a work-in-progress (WIP) version 210 of the printer software. A source code is used that can be an edited copy of the one that produced the original production version 204. The WIP version 210 is given the same job of interpreting the test suite 202. Its output is a test-image bit-map that is stored in a memory 212.

A subtractor 214 computes the differences in the bit-maps stored in memories 206 and 212. The result is a picture that can rapidly be assessed by a user when displayed on a computer screen 216. For example, a user or programmer 218 could use the clues provided in the visual display 216 and use a source code editor 220 to make corrections. The revised source code is then recompiled by the compiler/assembler 208.

Once the user 218 is satisfied with the difference bit-map displayed on screen 216, such user then causes the WIP version 210 to replace the previous production version 204. A new "gold" bit-map is then generated from the test suite 202.

Although the invention is described herein with reference to the preferred embodiment, one skilled in the art will readily appreciate that other applications may be substituted for those set forth herein without departing from the spirit and scope of the present invention. Accordingly, the present invention should only be limited by the Claims included below.

What is claimed is:

1. A development system for the software validation of revisions to a printer's internal software, comprising:

a test suite of commands providing for an exercise of one or more commands and capabilities of a printer;

a first version of embedded printer software;

a first result generated by said first version from said test suite;

a second version of said embedded printer software;

a second result generated by said second version from said test suite and stored;

a subtractor for identifying differences between said first and second results; and a computer screen for displaying a difference bit-map provided by the subtractor.

2. The development system of claim 1, further comprising:

a source code editor for use by a user providing for a rewriting of a source code program used to generate the work-in-progress (WIP) revision of the production version of said embedded printer-control-language interpreter, according to information observed on the computer screen.

* * * * *